C. L. HORN, Jr.
ACCOUNT KEEPING DEVICE.
APPLICATION FILED JULY 19, 1920.
1,408,508.
Patented Mar. 7, 1922.
2 SHEETS—SHEET 2.
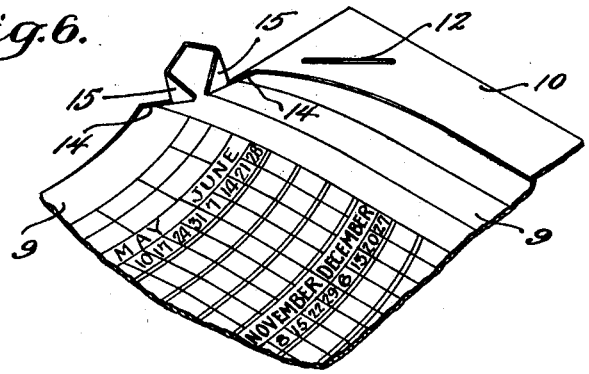
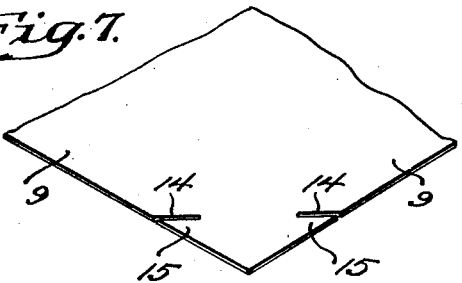
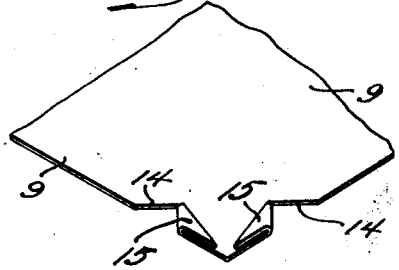
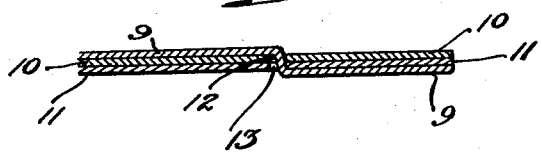
WITNESSES:
Walter Chism
Augustus B. Copper
INVENTOR.
Charles L. Horn Jr.
BY Joshua R. H. Potts
ATTORNEY.

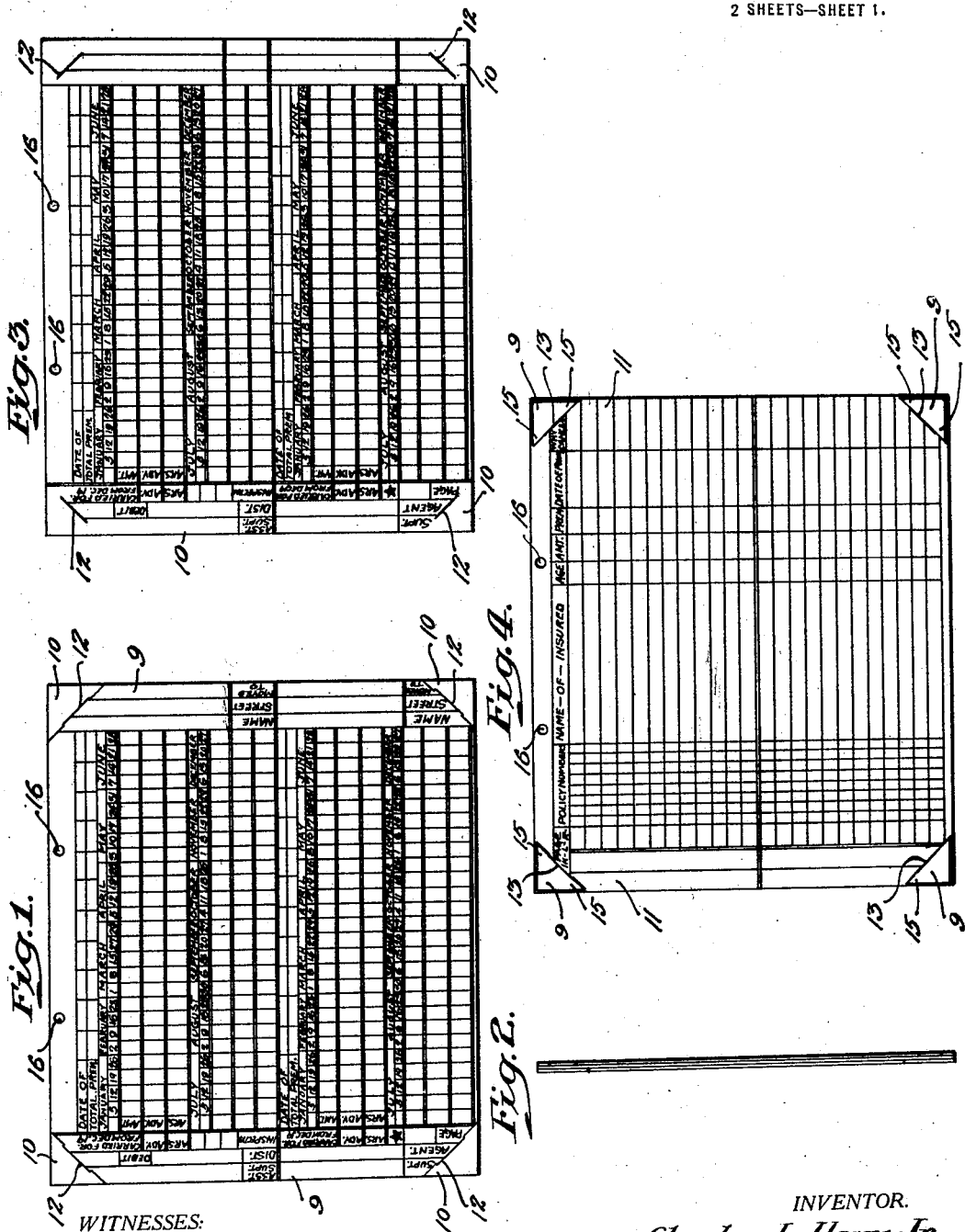

UNITED STATES PATENT OFFICE.

CHARLES L. HORN, JR., OF PHILADELPHIA, PENNSYLVANIA.

ACCOUNT-KEEPING DEVICE.

1,408,508.  Specification of Letters Patent.  Patented Mar. 7, 1922.

Application filed July 19, 1920. Serial No. 397,408.

*To all whom it may concern:*

Be it known that I, CHARLES L. HORN, Jr., a citizen of the United States, residing at Philadelphia, in the county of Philadelphia and State of Pennsylvania, have invented certain new and useful Improvements in Account-Keeping Devices, of which the following is a specification.

One object of my invention is to provide an account keeping device which will be of particular advantage for use by collectors, such for example by collectors or agents for insurance companies where payments are made in weekly installments; the insured persons sometimes being paid up in advance and sometimes being in arrears.

Another object of my invention is to so construct my improved account keeping device that it can be made of paper and a number of them can be made up in book form for example in any loose-leaf binding cover so that any of the devices can be removed at will or others added.

It is also well known that insurance companies often call upon the agents to produce their records for examination or inspection. This requires that the agent be put to considerable trouble and is often compelled to take many hours of his time in order to comply with the orders of the home office. By the method now in general use the individual accounts do not stand out clear for inspection since they do not show on their face the exact standing of the policy holders and the inspection work is made difficult and unreliable for the home office. If the agents have been carrying bad business on their books, with the methods now in general use it is difficult at times for the inspectors to locate the bad business and the agent is able to manipulate his accounts so as to cover the bad business which is actually on his books.

Another object is to so construct the device of my invention that the exact standing at the end of each payment date will be clearly shown on the face of the device; thus enabling an agent to carry on his accounting with ease so that the record will clearly show the exact condition of the business held by the agent.

A further object is that a duplicate record will be produced so that if the agent is called upon by the home office for his record he can send the duplicate and keep the original or vice versa; thus avoiding the necessity of going over an entire book or any individual account upon which the home office desires information.

Another object is to so construct my improved device that all information relating to separate accounts can be kept in compact or unit form and thereby greatly facilitate the work of the agent and home office.

A still further object is to provide on a single page an accounting record for an entire year where installments are to be recorded at weekly intervals so that an agent can keep his accounts in compact form from the beginning to the end of the year.

These objects, and other advantageous ends which will be described hereinafter, I attain in the following manner, reference being had to the accompanying drawings in which Figure 1 is a face view of one of my improved devices showing the same ready for attachment to a book cover such for example as a loose-leaf binding cover; the device being able to support the accounts in weekly payments of two insurance policy holders, Figure 2 is an edge view of Figure 1, Figure 3 is a face view of an intermediate or duplicate sheet included in the device shown in Figures 1 and 2, Figure 4 is a rear view of Figure 1, Figure 5 is an enlarged fragmentary section taken diagonally through one of the corners of the device, Figure 6 is a fragmentary detached perspective view showing how the corners of the front or top sheet can be folded and inserted through the slots of the other two sheets and locked so that the three sheets are held together as a unit for binding in a book cover; Figure 4 showing how the corners of the front sheet are locked by spreading the tongues after the corners have been inserted through said slots, Figure 7 is a fragmentary perspective view showing one corner of the front sheet before the tongues are folded over so as to permit insertion through said slots, and Figure 8 is a view of similar character to Figure 7 showing the tongues bent over to permit said insertion; these tongues afterwards being again straightened out after the corner has been inserted through the slots.

Referring to the drawings, I have shown my improved device including as a unit three sheets of paper, a front sheet 9, an intermediate or duplicate sheet 10 and a rear sheet 11. The duplicate sheet 10 and the rear sheet 11 have slots 12 and 13 adjacent their four corners and the front sheet has its corners slit or cut inwardly as shown at 14 to provide tongues 15 which may be folded over as shown in Figures 6 and 8 to permit the corners to be inserted through the slots 12 and 13 and afterwards bent into the plane of the corners so as to lock the three sheets, 9, 10 and 11 together. These sheets are each provided with holes such as shown at 16; said holes registering to permit the unit device to be connected for example to the rings of a loose-leaf binding cover so that a number of the devices can be made up in book form. The rear surface of the front sheet 9 which forms the original copy or record may be covered with carbon so that when a mark is made upon the front sheet a duplicate mark will be made upon the duplicate sheet 10. The uppermost surfaces of the front sheet 9 and duplicate sheet 10 are printed to include blocked divisions for accounts in weekly payments for the year for two persons, such for example as for two policy holders of insurance companies and in the following description it is therefore necessary to describe but one of these sheets in detail.

Each division has representations of the months of the year which are divided into columns; the headings of the columns having the dates of the weeks of the month, for example every Monday of each week of each month. Directly under the dates of the weeks is a transverse division of the columns consisting of a row of blocks for the amount due each weekly installment. Under this row of blocks is another row indicating advance payments and under the advance payment row is a row or sub-division of the columns indicating arrears in payments. The margin to the left is divided to give the arrears or advance payments at the end of the year; said arrears and advance payments being in alignment with the rows of weekly advance payments or arrears and the remaining portion of the margin at the left side includes spaces such for example as for the name of the superintendent, assistant superintendent, agent, district, amount of debit, the dates of inspection and page numbers. At the opposite margin appears the name of the insured, the street number and a space permitting change of address of the insured. The rear face of the rear sheet 11 is preferably printed as shown in Figure 4 to list the names of the insured and policy numbers together with spaces for other general information required as to the policy holder and an agent in marking upon the front face of the sheet 9 can keep an accurate record of the weekly payments, the condition of advance payments or of arrears and this marking will be reproduced similarly upon the front face of the duplicate sheet 10. If the agent is called upon to produce a record of his accounts he can either send the front sheets 9 of the devices or the duplicate sheets 10 without requiring additional work of making up a separate record and the home office can then inspect the account and see the exact marking of the agent in a manner similar to the original marking. Furthermore the policy holder can easily determine whether the agent is keeping an accurate account of the payments since it is an easy matter to read a report made upon a device constructed in accordance with my present invention.

To detach the sheets it is merely necessary to refold the tongue 15 into the position shown in Figure 8 and withdraw the corners of the front sheet from the slots 12 and 13. All of the sheets will be firmly held together so that the devices can be turned as a unit in the same manner as an ordinary page of a book. The tops of the sheets 9 and 10 are preferably divided to indicate the date of and total premium and the left hand margin includes a space for indicating the amount carried forward from the previous year so that all of the record necessary in contained upon the device.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. An account keeping device including a sheet divided into sections having headings appropriately designated and representative of the months and columns forming weekly divisions of the months, said columns being sub-divided into rows appropriately designated to indicate amounts paid during said weeks, advance payments and arrears in payments, all arranged in column form under each weekly heading; substantially as described.

2. An account keeping device including a sheet divided into sections having headings appropriately designated and representative of the months; and columns forming weekly divisions of the months, said columns being sub-divided into rows appropriately designated to indicate amounts paid during said weeks, advance payments and arrears in payments, all arranged in column form under each weekly heading, said sheet having other spaces appropriately designated for the marking of advance payments or arrears in payments for the year; substantially as described.

3. An account keeping device including a sheet divided into sections having headings appropriately designated and representative of the months and columns forming weekly divisions of the months, said columns being sub-divided into rows appropriately designated to indicate amounts paid during said weeks, advance payments and arrears in payments, all arranged in column form under each weekly heading, said sheet having other spaces appropriately designated for the marking of advance payments and arrears in payments for the year, said sheet having other spaces appropriately designated to indicate the amounts carried forward from a preceding year and other information relating to the account; substantially as described.

4. A credit card having an appropriately designated space on which a mark will indicate a payment in regular course, and another appropriately designated space on which the same mark will indicate a payment out of regular course.

5. A means of recording payments comprising a delineated and appropriately designated space for indicating a payment in regular course, and a delineated and appropriately designated space for indicating a payment when past due.

6. A card, an appropriately designated place thereon for indicating payments made when due, and an appropriately designated place thereon for indicating payments made when past due.

7. A credit card having a delineated and appropriately designated space on which a date mark in one position will indicate a payment in regular course but the same date mark in another position will indicate a payment out of regular course.

8. A credit card, an appropriately designated column thereon to receive a mark to indicate a timely payment, and an appropriately designated column adjacent thereto to receive a mark to indicate a tardy payment.

9. A pair of cards having registering columns and means for indicating a payment in either of a plurality of columns to indicate the timeliness of the payment at the time it is made.

10. A pair of cards having registering columns and means for indicating a payment in either of a plurality of columns to indicate the condition of the account at the time the payment is made.

In testimony whereof I have signed my name to this specification in the presence of two subscribing witnesses.

CHARLES L. HORN, Jr.

Witnesses:
  ELIZEBETH GARBE,
  CHAS. E. POTTS.